United States Patent
Springer, Sr. et al.

(10) Patent No.: US 7,124,128 B2
(45) Date of Patent: Oct. 17, 2006

(54) METHOD, SYSTEM, AND PROGRAM FOR MANAGING REQUESTS TO TRACKS SUBJECT TO A RELATIONSHIP

(75) Inventors: James Alan Springer, Sr., Tucson, AZ (US); Matthew Sanchez, Tucson, AZ (US); Theresa Mary Brown, Tucson, AZ (US); Richard Kenneth Martinez, Tucson, AZ (US); Gail Andrea Spear, Tucson, AZ (US); Sam Clark Werner, Tucson, AZ (US); Thomas Charles Jarvis, Tucson, AZ (US); Thomas John Creath, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 10/463,967

(22) Filed: Jun. 17, 2003

(65) Prior Publication Data

US 2004/0267706 A1    Dec. 30, 2004

(51) Int. Cl.
*G06F 17/30* (2006.01)
(52) U.S. Cl. .......................... 707/3; 707/101; 707/201
(58) Field of Classification Search ................ 707/2–5, 707/101, 201, 200, 205; 711/3, 141–146
See application file for complete search history.

(56) References Cited

U.S. PATENT DOCUMENTS

| | | | | |
|---|---|---|---|---|
| 5,867,685 A * | 2/1999 | Fuld et al. | ........... | 711/113 |
| 6,345,338 B1 * | 2/2002 | Milillo et al. | ........... | 711/137 |
| 6,567,888 B1 * | 5/2003 | Kedem | ........... | 711/113 |
| 6,611,901 B1 | 8/2003 | Micka et al. | ........... | 711/162 |
| 2004/0107302 A1 * | 6/2004 | Vishlitzky et al. | ........... | 710/1 |

* cited by examiner

*Primary Examiner*—Greta Robinson
*Assistant Examiner*—Cheryl Lewis
(74) *Attorney, Agent, or Firm*—David W. Victor; Konrad Raynes & Victor LLP

(57) ABSTRACT

Provided are a method, system, and program for managing data. A data request is received to a target track in a relationship, wherein the relationship associates a source track with the target track. A destage request to destage the source track is submitted in response to the data request to the target track, wherein executing the data request to the target track is conditioned on receiving a completion response to the destage request. If the source track is not in cache, then a complete response is returned to the destage request. If the source track was in cache when the relationship was established, then the destage request is added to an Input/Output (I/O) queue for the source track. After the source track is destaged in response to processing the destage request in the I/O queue, the complete response is returned to the destage request.

33 Claims, 15 Drawing Sheets

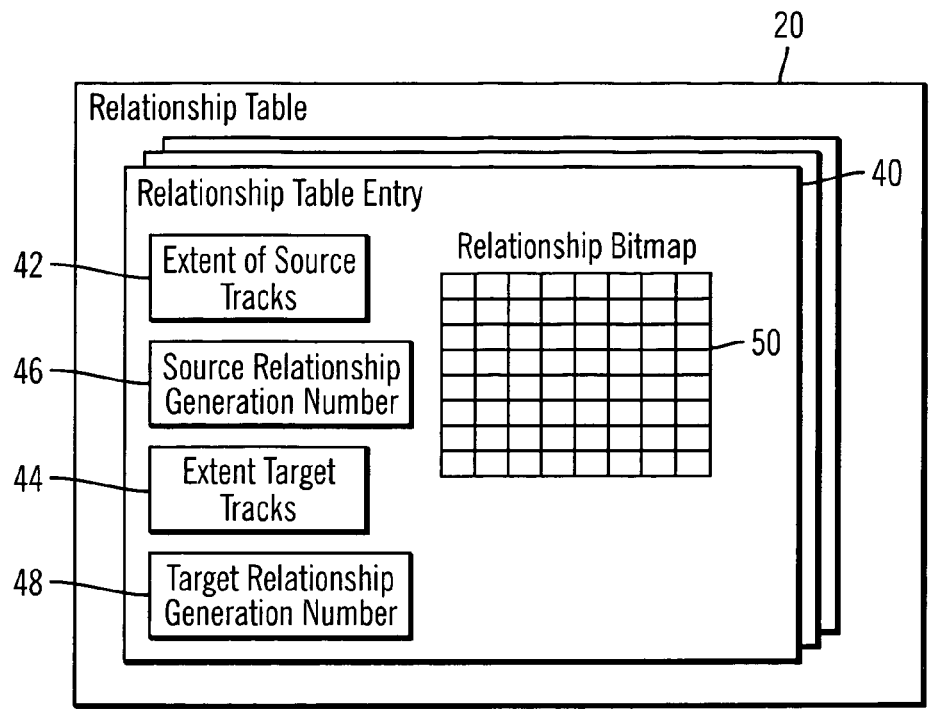
FIG. 2
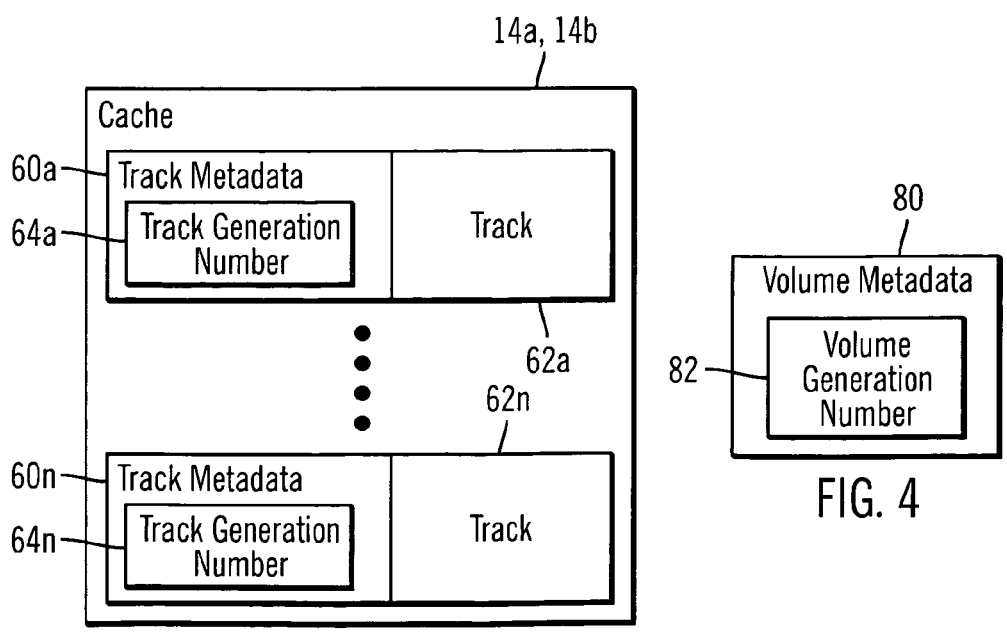
FIG. 3
FIG. 4

METHOD, SYSTEM, AND PROGRAM FOR MANAGING REQUESTS TO TRACKS SUBJECT TO A RELATIONSHIP

BACKGROUND OF THE INVENTION

1. Field of the Invention

The present invention relates to a method, system, and program for managing requests to tracks subject to a relationship.

2. Description of the Related Art

Computing systems often include one or more host computers ("hosts") for processing data and running application programs, direct access storage devices (DASDs) for storing data, and a storage controller for controlling the transfer of data between the hosts and the DASD. Storage controllers, also referred to as control units or storage directors, manage access to a storage space comprised of numerous hard disk drives connected in a loop architecture, otherwise referred to as a Direct Access Storage Device (DASD). Hosts may communicate Input/Output (I/O) requests to the storage space through the storage controller.

In many systems, data on one storage device, such as a DASD, may be copied to the same or another storage device so that access to data volumes can be provided from two different devices. A point-in-time copy involves physically copying all the data from source volumes to target volumes so that the target volume has a copy of the data as of a point-in-time. A point-in-time copy can also be made by logically making a copy of the data and then only copying data over when necessary, in effect deferring the physical copying. This logical copy operation is performed to minimize the time during which the target and source volumes are inaccessible.

One such logical copy operation is known as FlashCopy® (FlashCopy is a registered trademark of International Business Machines, Corp. or "IBM"). FlashCopy® involves establishing a logical point-in-time relationship between source and target volumes on different devices. Once the logical relationship is established, hosts may then have immediate access to data on the source and target volumes, and the data may be copied as part of a background operation. Reads to any tracks in the target cache that have not been updated with the data from the source causes the source track to be staged to the target cache before access is provided to the track from the target cache. Any reads of data on target tracks that have not been copied over cause the data to be copied over from the source device to the target cache so that the target has the copy from the source that existed at the point-in-time of the FlashCopy® operation. Further, any writes to tracks on the source device that have not been copied over cause the tracks on the source device to be copied to the target device.

In the prior art, as part of the establishment of the logical point-in-time relationship during the FlashCopy® operation, all tracks in the source cache that are included in the FlashCopy® must be destaged to the physical source volume, e.g., source DASD, and all tracks in the target cache included in the FlashCopy® must be discarded. These destage and discard operations during the establishment of the logical copy relationship can take several seconds, during which I/O requests to the tracks involved in the copy relationship are suspended. In critical operating environments, there is a continued effort to minimize any time during which I/O access is suspended. Further details of the FlashCopy® operations are described in the copending and commonly assigned U.S. patent application Ser. No. 09/347,344, now U.S. Pat. No. 6,611,901 filed on Jul. 2, 1999, entitled "Method, System, and Program for Maintaining Electronic Data as of a Point-in-Time", which patent application is incorporated herein by reference in its entirety.

For these reasons, there is a continued need in the art to reduce the time needed to complete establishing a logical point-in-time copy between a source and target volumes.

SUMMARY OF THE DESCRIBED IMPLEMENTATIONS

Provided are a method, system, and program for managing data. A data request is received to a target track in a relationship, wherein the relationship associates a source track with the target track. A destage request to destage the source track is submitted in response to the data request to the target track, wherein executing the data request to the target track is conditioned on receiving a completion response to the destage request. If the source track is not in cache, then a complete response is returned to the destage request. If the source track was in cache when the relationship was established, then the destage request is added to an Input/Output (I/O) queue for the source track. After the source track is destaged in response to processing the destage request in the I/O queue, the complete response is returned to the destage request.

In still further implementations, the destaged source track is staged to the target track in cache after receiving the complete response to the destage request and the data request to the target track is performed after staging the destaged source track.

In additional implementations, I/O requests to the source track are handled by a first processor and I/O requests to the target track are handled by a second processor, wherein the first and second processors maintain relationship information on relationships including tracks they manage.

In yet further implementations, a request to destage the source track from cache is processed and a determination is made as to whether there is at least one destage request in the I/O queue for the source track submitted in response to the data request to the target track. The complete response to the destage request submitted is returned in response to the data request to the target track.

BRIEF DESCRIPTION OF THE DRAWINGS

Referring now to the drawings in which like reference numbers represent corresponding parts throughout:

FIGS. 2, 3, and 4 illustrates data structures used to maintain a logical point-in-time copy relationship in accordance with implementations of the invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
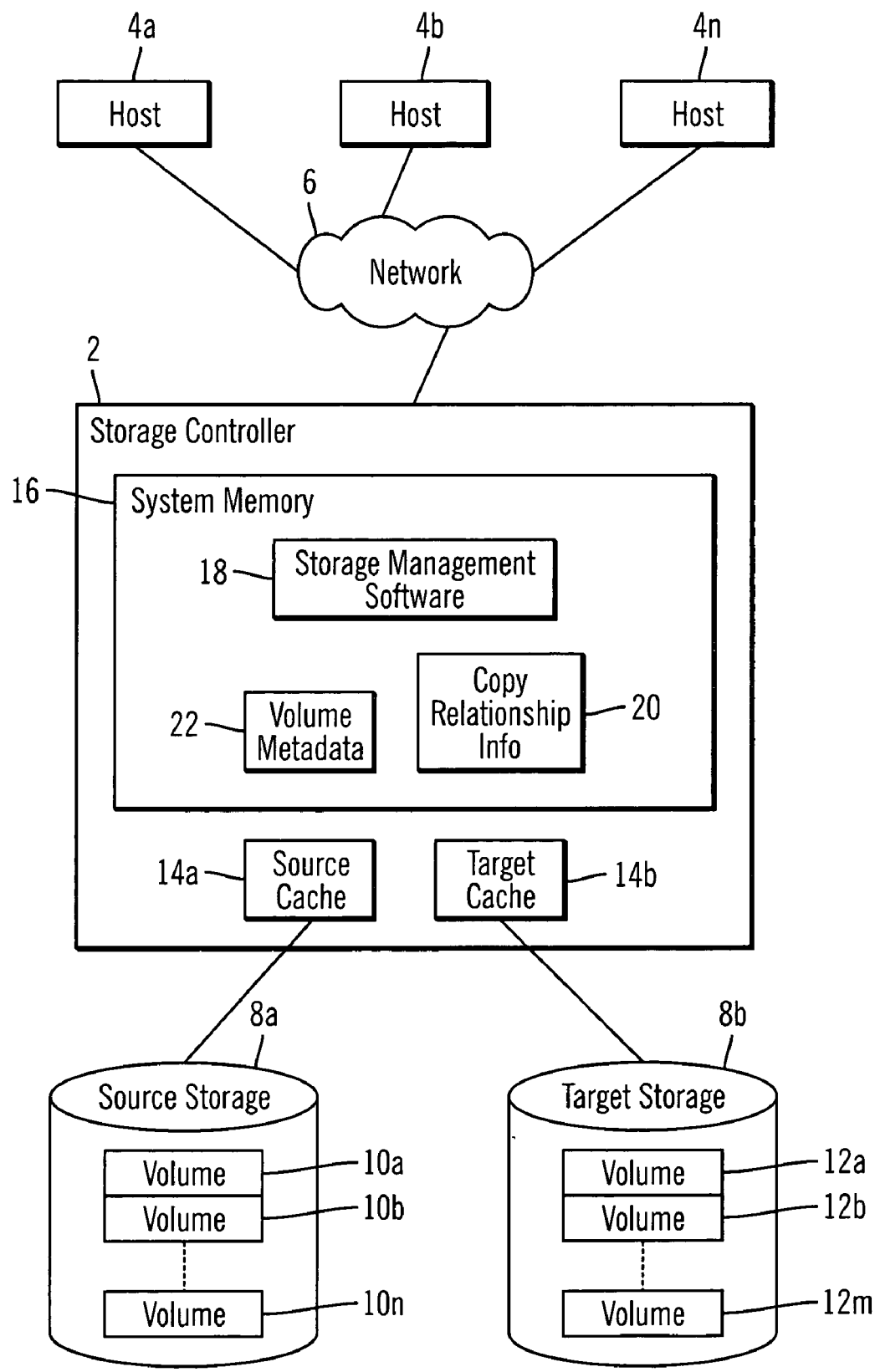
FIG. 1 illustrates a computing environment in which aspects of the invention are implemented.

FIG. 1 illustrates a computing architecture in which aspects of the invention are implemented. A storage controller 2 would receive Input/Output (I/O) requests from host systems 4a, 4b . . . 4n over a network 6 directed toward storage devices 8a, 8b configured to have volumes (e.g., Logical Unit Numbers, Logical Devices, etc.) 10a, 10b . . . 10n and 12a, 12b . . . 12m, respectively, where m and n may be different integer values or the same value. The storage controller 2 further includes a source cache 14a to store I/O data for tracks in the source storage 8a and a target cache 14b to store I/O data for tracks in the target storage 8b. The source 14a and target 14b caches may comprise separate memory devices or different sections of a same memory device. The caches 14a, 14b are used to buffer read and write data being transmitted between the hosts 4a, 4b . . . 4n and the storages 8a, 8b. Further, although caches 14a and 14b are referred to as source and target caches, respectively, for holding source or target tracks in a point-in-time copy relationship, the caches 14a and 14b may store at the same time source and target tracks in different point-in-time copy relationships.

The storage controller 2 also includes a system memory 16, which may be implemented in volatile and/or non-volatile devices. Storage management software 18 executes in the system memory 16 to manage the copying of data between the different storage devices 8a, 8b, such as the type of logical copying that occurs during a FlashCopy® operation. The storage management software 18 may perform operations in addition to the copying operations described herein. The system memory 16 may be in a separate memory device from caches 14a, 14b or a part thereof. The storage management software 18 maintains a relationship table 20 in the system memory 16 providing information on established point-in-time copies of tracks in source target volumes 10a, 10 b . . . 10n at specified tracks in target volumes 12a, 12b . . . 12m. The storage controller 2 further maintains volume metadata 22 providing information on the volumes 10a, 10b . . . 10n, 12a, 12b . . . 12m.

The storage controller 2 would further include a processor complex (not shown) and may comprise any storage controller or server known in the art, such as the IBM Enterprise Storage Server (ESS)®, 3990® Storage Controller, etc. (Enterprise Storage Server is a registered trademark of IBM). The hosts 4a, 4b . . . 4n may comprise any computing device known in the art, such as a server, mainframe, workstation, personal computer, hand held computer, laptop, telephony device, network appliance, etc. The storage controller 2 and host system(s) 4a, 4b . . . 4n communicate via a network 6, which may comprise a Storage Area Network (SAN), Local Area Network (LAN), Intranet, the Internet, Wide Area Network (WAN), etc. The storage systems 8a, 8b may comprise an array of storage devices, such as a Just a Bunch of Disks (JBOD), Redundant Array of Independent Disks (RAID) array, virtualization device, etc.

When a host 4a, 4b . . . 4n initiates a point-in-time copy operation for specified tracks in volumes 10a, 10b . . . 10n in the source storage 8a to specified tracks in volumes 12a, 12b . . . 12m in the target storage 8b, the storage management software 18 will generate the relationship table 20 information when establishing a logical point-in-time copy. FIG. 2 illustrates data structures that may be included in the relationship table 20 generated by the storage management software 18 when establishing a point-in-time copy operation implemented. The relationship table 20 is comprised of a plurality of relationship table entries 40, only one is shown in detail, for each established relationship between a source and target volumes. Each relationship table entry 40 includes an extent of source tracks 42 indicating those source tracks in the source storage 8a involved in the point-in-time relationship and the corresponding extent of target tracks 44 in the target storage 8b involved in the relationship, wherein an ith track in the extent of source tracks 44 corresponds to the ith track in the extent of target tracks 46. A source relationship generation number 46 and target relationship number 48 indicate a time, or timestamp, for the source relationship including the tracks indicated by source extent 44 when the point-in-time copy relationship was established. The source and target relationship generation numbers 46 and 48 may differ if the source and target volume generation numbers differ. The timestamp indicated by the numbers 46 and 48 may comprise a logical timestamp value. In alternative implementations, alternative time tracking mechanisms may be used to keep track of the information maintained by numbers 46 and 48, such as whether an update occurred before or after the point-in-time copy relationship was established.

Each relationship table entry 40 further includes a relationship bit map 50. Each bit in the relationship bitmap 50 indicates whether a track in the relationship is located in the source storage 8a or target storage 8b. For instance, if a bit is "on" (or "off"), then the data for the track corresponding to such bit is located in the source storage 8a. In implementations where source tracks are copied to target tracks as part of a background operation after the point-in-time copy is established, the bit map entries would be updated to indicate that a source track in the point-in-time copy relationship has been copied over to the corresponding target track. In alternative implementations, the information described as implemented in the relationship bitmap 50 may be implemented in any data structure known in the art, such as a hash table, etc.

In FIG. 2, each relationship table entry 40 includes both information on the source and target tracks involved in the relationship. In certain implementations, there may be separate source and target relationship table entries that maintain only information on the source side of the relationship, such as the source extent 42 and source generation number 46 and entries that have only information on the target side, such as the target extent 44 and target generation number 48, and additional information in each to associate the source and target relationship table entries. The relationship table entries 40 may indicate additional information, such as the device address of the source 8a and target 8b storage devices, number of tracks copied over from the source extent 42 to the target extent 44, etc. As discussed, after the point-in-time copy is established, the physical data may be copied over from the source to target as part of a background operation. Additional information that may be maintained in a relationship table used to establish a point-in-time copy is further described in the co-pending and commonly assigned patent application entitled "Method, System, and Program for Maintaining Electronic Data at of a Point-in-time", having U.S. application Ser. No. 09/347,344 now U.S. Pat. No. 6,611,901 and filed on Jul. 21, 1999, which application is incorporated herein by reference in its entirety.

In described implementations, additional relationship information may be maintained for each track in cache 14a, 14b and with each volume 10a, 10b . . . 10n, 12a, 12b . . . 12m including tracks involved in the point-in-time copy, i.e., tracks identified in the source 44 and target 46 extents. FIG. 3 illustrates that caches 14a, 14b include track metadata 60a . . . 60n for each track 62a . . . 62n in cache 14a, 14b. In described implementations, the track metadata 60a . . . 60n includes a track generation number 64a . . . 64n that is used to maintain data consistency for the logical point-in-time copy relationship as discussed below. The track generation number 64a . . . 64n indicates a time or timestamp of the volume, referred to as the volume generation number, of the volume including the track when the track is promoted into cache.

FIG. 4 illustrates volume metadata 80 within the volume metadata 22 that would be maintained for each volume 10a, 10b . . . 10n and 12a, 12b . . . 12m configured in storage 8a, 8b. In certain implementations, the volume metadata 80 would additionally include a volume generation number 82 for the particular volume that is used in maintaining the point-in-time copy relationship as discussed below. The volume generation number 82 is incremented each time a relationship table entry 40 is established in which the volume is a target or source. Thus, the volume generation number 82 is the clock and indicates a timestamp following the most recently created relationship generation number for the volume. Each source and target volume would have volume metadata providing a volume generation number for that volume involved in a relationship as a source or target.

Figure 5:
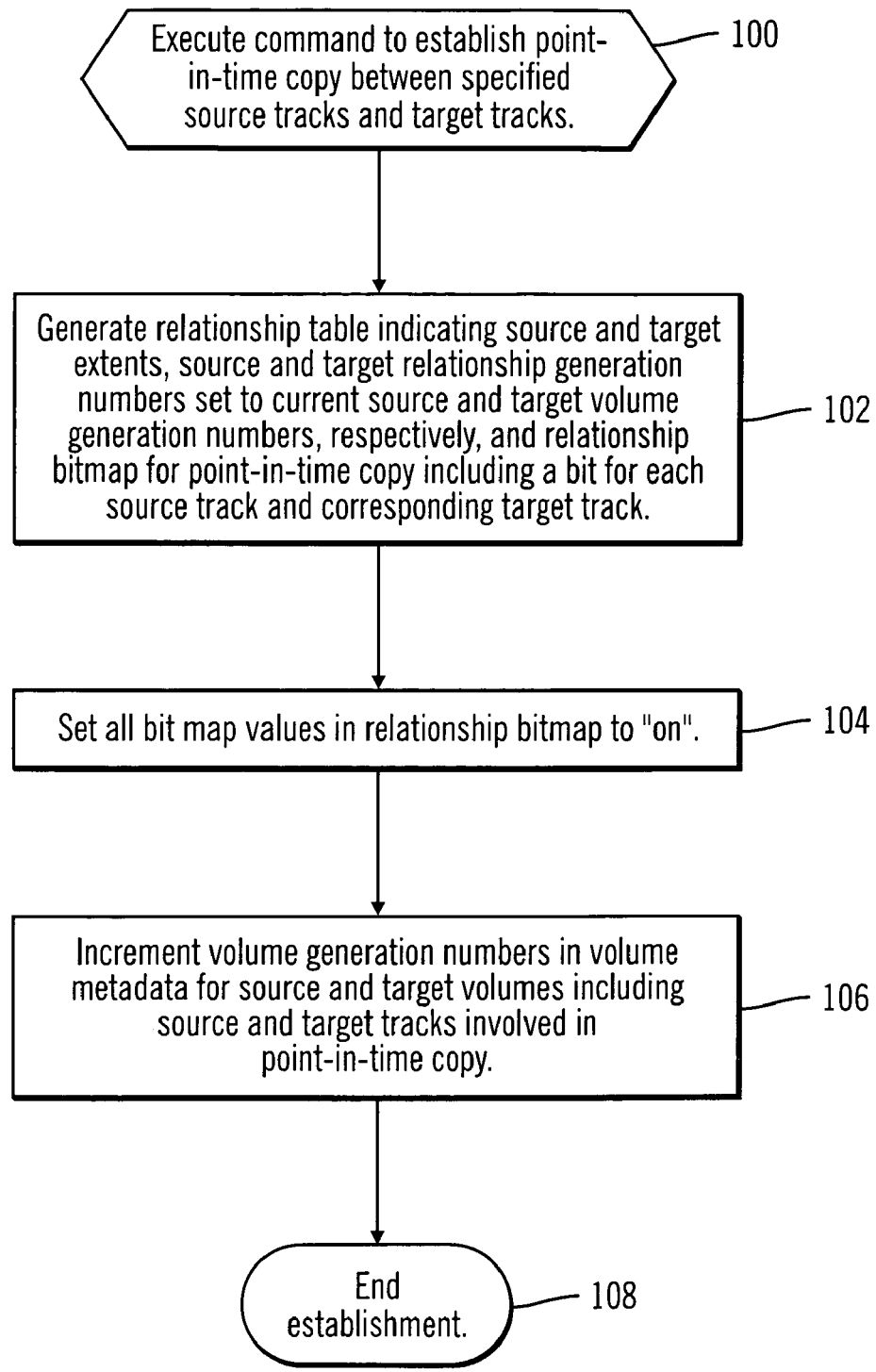
FIGS. 5, 6, 7, 8, 9, 10, and 11 illustrate logic to establish and maintain a logical point-in-time copy relationship in accordance with implementations of the invention.

FIG. 5 illustrates logic implemented in the storage management software 18 to establish a point-in-time copy relationship between tracks in the source storage 8a and tracks in the target storage 8b, such as may occur as part of a FlashCopy® operation or any other type of logical copy operation. Upon receiving (at block 100) a command from a host 4a, 4b . . . 4n to establish a point-in-time copy relationship between specified source tracks and specified target tracks, the storage management software 18 generates (at block 102) a relationship table entry 40 indicating an extent of source tracks 42 and target tracks 44 subject to the logical copy relationship; source and target relationship generation numbers 46, 48 set to the current source and target volume generation numbers of the source and target volumes including the source and target tracks; and a relationship bitmap 50 including a bit for each target-source track pair indicating whether the data from the source track has been copied to the corresponding target track. All the bits in the relationship bitmap 40 may be initialized (at block 104) to "on". As mentioned, a background copy operation may copy the source tracks to the target tracks after the logical point-in-time copy is established. When a source track is copied to a target track as part of such a background copy operation or any other operation, then the bit corresponding to the source track just copied to the target track is set to "off" indicating that the source track as of the point-in-time has been copied to the corresponding target track at the target storage 8b. The storage management software 18 then increments (at block 106) the volume generation numbers 82 in the volume metadata 80 for the source and target volumes including source and target tracks included in the point-in-time copy relationship.

With the described logic, the establishment process ends after generating the copy relationship information as a relationship table entry 40 and updating the volume metadata 80. With the described logic, the point-in-time copy relationship is established without having to destage any source tracks in the source cache 14a and discard target tracks in the target cache 14b. This reduces the establishment process by a substantial amount of time, such as several seconds, thereby reducing the time during which the source and target volumes are offline to host I/O access during the establishment of the point-in-time copy relationship.

Figure 6:
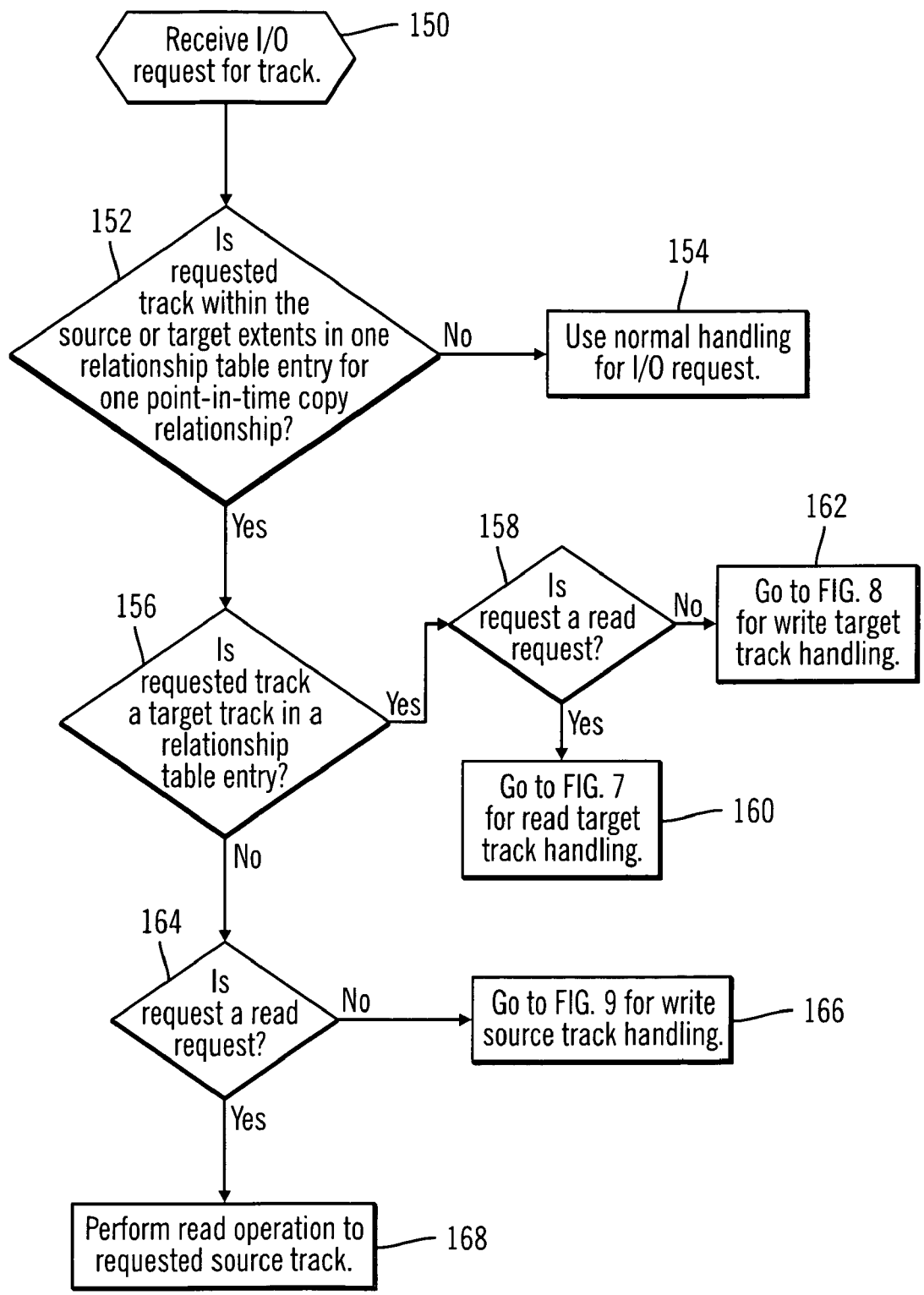

FIGS. 6–11 illustrates logic implemented in the storage management software 18 to use the track and volume generation numbers to handle I/O requests and ensure data consistency for the logical point-in-time copy. FIG. 6 illustrates logic to handle an I/O request from a host 4a, 4b . . . 4n. Upon receiving (at block 150) a host I/O request toward a track in one of the storage resources 8a, 8b, the storage management software 18 determines (at block 152) whether the requested tracks are within the source 42 or target 44 extents indicated in at least one relationship table entry 40 for one point-in-time copy relationship. There may be multiple point-in-time copy relationships, represented by different relationship table entries, in effect at any given time. If the requested tracks are not subject to any point-in time copy relationship, then normal I/O request handling is used (at block 154) for the request.

Figure 7:
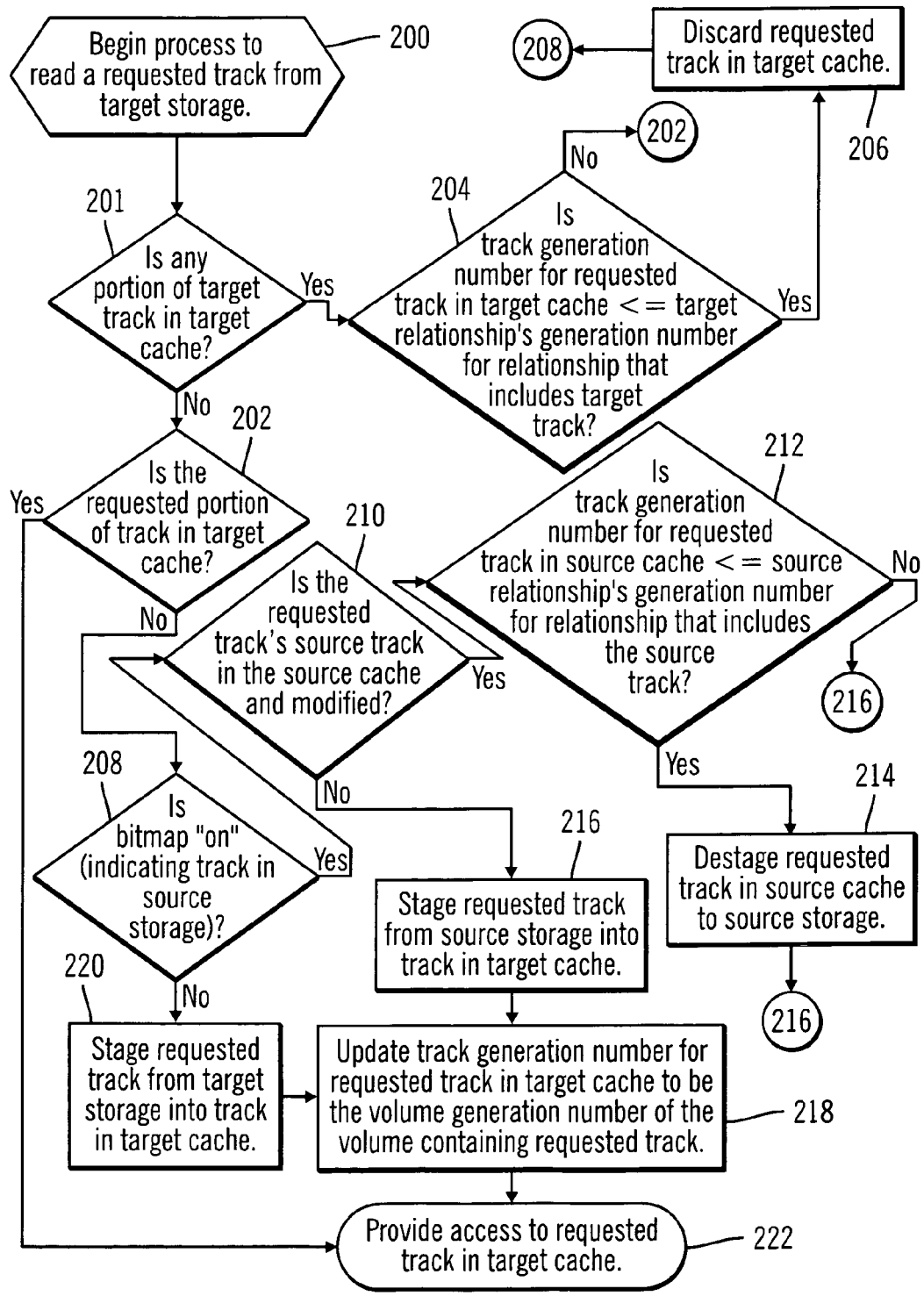
Figure 8:
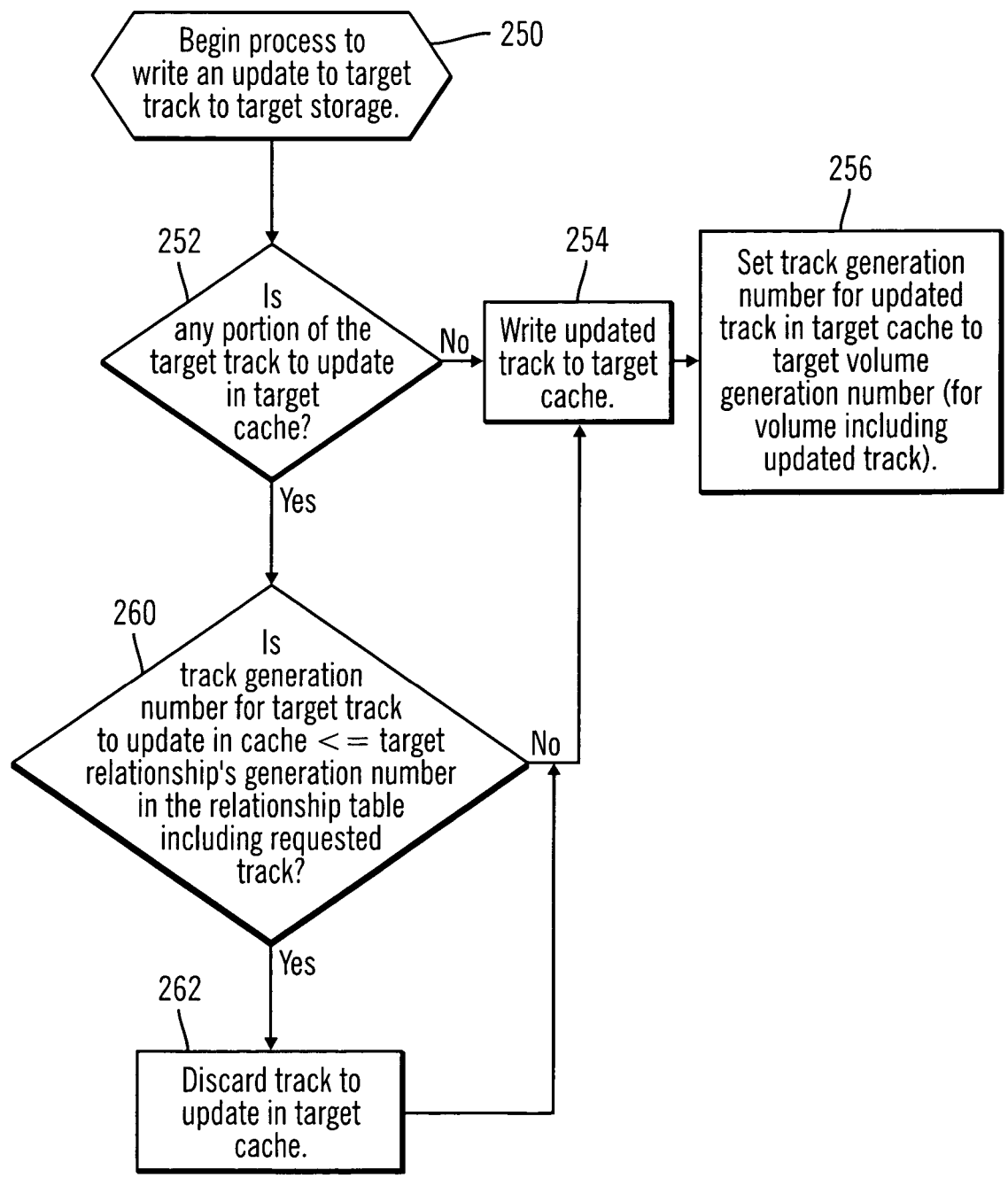

If the track subject to the I/O operation is a source and/or target in one or more point-in-time copy relationships, i.e., indicated in a source 42 or target 44 extent in a relationship table entry 40 and if (at block 156) the requested track is included within an extent of target tracks 44 in a relationship table entry 40, then control proceeds (at block 160) to FIG. 7 if the I/O request is a read request or FIG. 8 (at block 162) if the request is a write to a target track. If (at block 156) the track subject to the I/O request is a source track, then if (at block 164) the request is a write, control proceeds (at block 166) to the logic of FIG. 9. Otherwise, if the request is to read to a track that is a source track in a point-in-time relationship, the storage management software 18 provides read access (at block 168) to the requested track.

At block 160 in FIG. 6, if the host 4a, 4b . . . 4n I/O request is to read a requested track that is a target track in a point-in-time copy relationship, then control proceeds to block 200 in FIG. 7 to read a target track from storage. If (at block 201) any portion of the target track is in the target cache 14b, then the storage management software 18 determines (at block 204) whether the track generation number 64a . . . 64n for the requested track in the target cache, which would be included in the track metadata 60a . . . 60n for the requested target track, is less than or equal to the target relationship generation number 48 for the relationship table entry 40 that includes the target track, i.e., was the target track in the target cache before the point-in-time relationship was created. If so, then the requested target track in the target cache 14b is discarded (at block 206).

If (from the no branch of block 204) the requested target track in the target cache was added to cache after the point-in-time relationship was established or if no portion of the target track is in the target cache 14b (from the no branch of block 201), then control proceeds to block 202. If (at block 202) the requested portion of the track is not in the target cache 14b, a determination is made (at block 208) as to whether the bit in the relationship bitmap 50 for the requested target track is "on", indicating that the track in the source storage has not been copied over. If the bit is "on", then the storage management software 18 determines (at block 210) whether the requested track's source track is in the source cache 14a and modified. If (at block 210) the track is in the source cache 14a and modified, then a determination is made (at block 212) as to whether the track generation number for the requested track in the source cache 14a is less than or equal to the source relationship generation number 46 in the relationship table entry 40 that includes the source track, i.e., whether the modified track was in the source cache 14a before the point-in-time relationship was established. If the requested track's source track in the source cache 14a was in cache prior to the establishment of the point-in-time relationship, then the storage management software 16 destages (at block 214) the requested track in the source cache 14a to the track in the source storage 8a.

From the no branch of block 212, from block 214 or from the no branch of block 210, control proceeds to stage (at block 216) the requested track from the source storage 8a into the corresponding target track in the target cache 14b. The track generation number 64a . . . 64n in the track metadata 60a . . . 60n for the target track is then updated (at block 218) to the volume generation number 82 in the volume metadata 80 (FIG. 4) for the volume including the requested target track. If (at block 208) the bitmap is off, indicating that the track in the source storage has been staged to the target storage 8b, then the requested track is staged (at block 220) from the target storage 8b into the target cache 14b. From blocks 202 (yes branch), 218 or 220, once the requested track is in the target cache 14b, then access is provided (at block 222) to the requested track in the target cache 14b.

At block 162 in FIG. 6, if the host 4a, 4b . . . 4n I/O request is to a write request to a target track in a point-in-time copy relationship, i.e., a track that is listed in an extent of target tracks 46 (FIG. 2), then the storage management software 18 executes the logic of FIG. 8 at block 250. If (at block 252) no portion of the target track to update is in the target cache 14b, then the storage management software 18 writes (at block 254) the update to the track to the target cache 14b and sets (at block 256) the track generation number 64a . . . 64n for the updated track in the target cache 14b to the volume's generation number 82 (FIG. 4) for the target volume including the updated track to indicate the updated track in cache was added after the point-in-time copy relationship including the target track was established. The bit may be turned "off" at the time of destage, not at the time of write.

If (at block 252) the target track to update is in the target cache 14b, then the storage management software 18 determines (at block 260) whether the track generation number 64a . . . 64n for the target track to update in the target cache 14b is less than or equal to the target relation generation number 48 (FIG. 2), i.e., whether the target track to update was in the target cache 14b before the point-in-time copy relationship was established. If so, then the target track to update in the target cache 14b is discarded (at block 262) because the target track to update was in the target cache 14b when the point-in-time copy relationship was established. From discarding (at block 262) the target track to update from the target cache 14b, control proceeds to block 254 to write the update to the target track in the target cache 14b. With the logic of FIG. 8, any data that was in the target cache 14b at the time the point-in-time copy relationship was established is discarded before updates are applied to such data in the target cache 14b.

Figure 9:
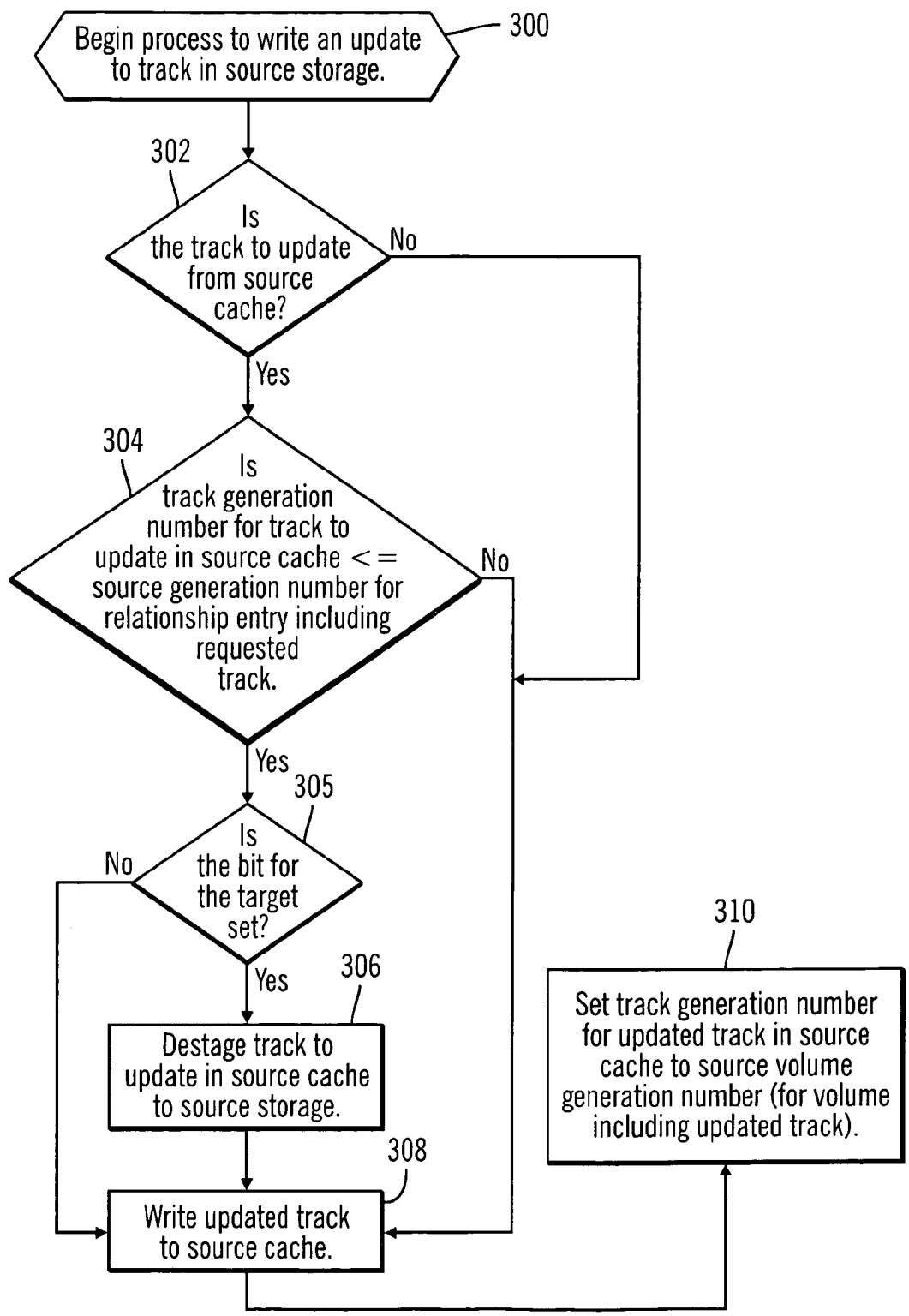

At block 166 in FIG. 6, if the host 4a, 4b . . . 4n I/O request is a write request to a track that is a source track in a point-in-time copy relationship, i.e., listed in an extent of source tracks 42 in one relationship table entry 40, then control proceeds to block 300 in FIG. 9. If (at block 302) the track to update is in the source cache 14a, then a determination is made (at block 304) as to whether the track generation number 64a . . . 64n (FIG. 3) for the track to update in the source cache 14a is less than or equal to the relationship generation number 48 for the source relation including the source track to update, which comprises a determination of whether the update will be applied to a track that was in the source cache 14a when the point-in-time copy was established. If the track to update was in the source device 8a when the point-in-time copy was established and if (at block 305) the relationship bitmap 50 for the relationship table entry 40 for the track indicates that the track to update is still in source cache 14a, then the storage management software 18 destages (at block 306) the track to update from the source cache 14a to the source storage 8a. If (at block 305) the bit for the track was not set after or destaging the track (at block 306) or if the track in the source cache 14a has been updated following the establishment of the point-in-time copy relationship (from the no branch of block 304), then control proceeds to block 308 to write the update to the source track in the source cache 14a. Further, if (at block 302) the source track to update is not in the source cache 14a, which means it is in the source storage 8a, then control proceeds to block 308 to write the update to the source track in the source cache 14a. The storage management software 18 then sets (at block 310) the track generation number 64a . . . 64n for the updated track in the source cache 14a to the source volume generation number 82 for the volume including the updated track.

Figure 10:
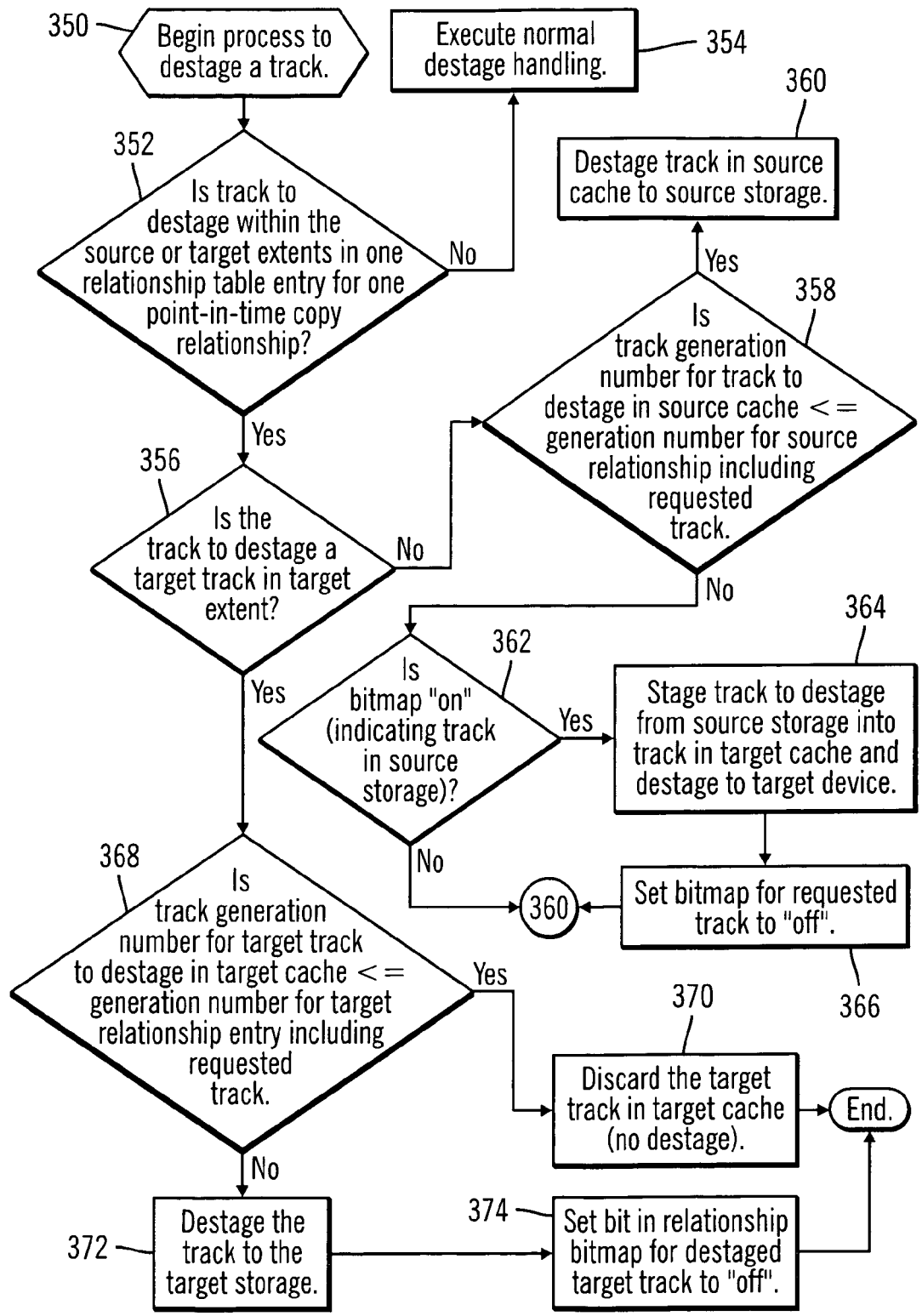

FIG. 10 illustrates logic implemented in the storage management software 18 to destage a track from cache in a manner that avoids any inconsistent operation with respect to the point-in-time copy relationship that was established without destaging data from the source cache 14a nor discarding any data from the target cache 14b. Data may be destaged from the caches 14a, 14b as part of normal cache management operations to make space available for subsequent data. Upon beginning the destage process (at block 350), if (at block 352) the track to destage is not within the source or target extents 42, 44 in one relationship table entry 40 for one point-in-time copy relationship, then the storage management software 18 performs (at block 354) normal destage handling. However, if the track subject to destage is a source or target in a point-in-time relationship and if (at block 356) the track to destage is a source track as indicated in an extent of source tracks 42, then a determination is made (at block 358) as to whether the track to destage was in the source cache 14a when the point-in-time copy relationship was established, which is so in certain implementations if the track generation number 64a . . . 64n for the track 62a . . . 62n (FIG. 3) to destage is less than or equal to the source relationship generation number 46 for the relationship table entry 40 including the track to destage. If the track to destage was in the source cache 14a when the point-in-time copy relationship was established, then the storage management software 18 destages (at block 360) the track to the source storage 8a. Otherwise, if (at block 358) the track was updated in cache after the point-in-time copy was established and if (at block 362) the bit in the relationship bitmap 50 corresponding to the track to destage is set to "on", indicating the track has not been copied over from the source storage, then the track to destage is staged (at block 364) from the source storage 8a to the target cache 14b and destaged to the target storage 8b. The bit corresponding to the track to destage in the relationship bitmap 50 is then set (at block 366) to "off". Control then proceeds to block 360 to destage the track from block 366 or if (at block 362) the bit is "off".

If (at block 356) the track to destage is a target track in a point-in-time relationship, i.e., in an extent of target tracks 44 in a relationship table entry 40 (FIG. 2), and if (at block 368) the track to destage was in the target cache 14b when the point-in-time copy relationship was established, which is so if the track generation number 64a . . . 64n for the track 62a . . . 62n to destage is less than or equal to the target relationship generation number 48 (FIG. 2) for the target track is discarded (at block 370). In such case, the track is not destaged to the target storage 8b. Otherwise, if (at block 368) the target track to destage was added to the target cache 14b after the point-in-time copy relationship was established, which is so if the track generation number 60a . . . 60n for the track 62a . . . 62n to destage is greater than the target relationship generation number 48 (FIG. 2), then the track in the target cache 14b is destaged (at block 372) to the target storage 8b and the bit corresponding to the track in the relationship bitmap 40 is set to "off", because the updated track was destaged after the point-in-time copy relationship was established. When destaging data from cache, if the bit for the track in the target relationship bitmap is "on", and if any portion of the target track to destage is not in cache, then that missing data is staged into cache from the source so that the entire track is destaged from cache.

Figure 11:
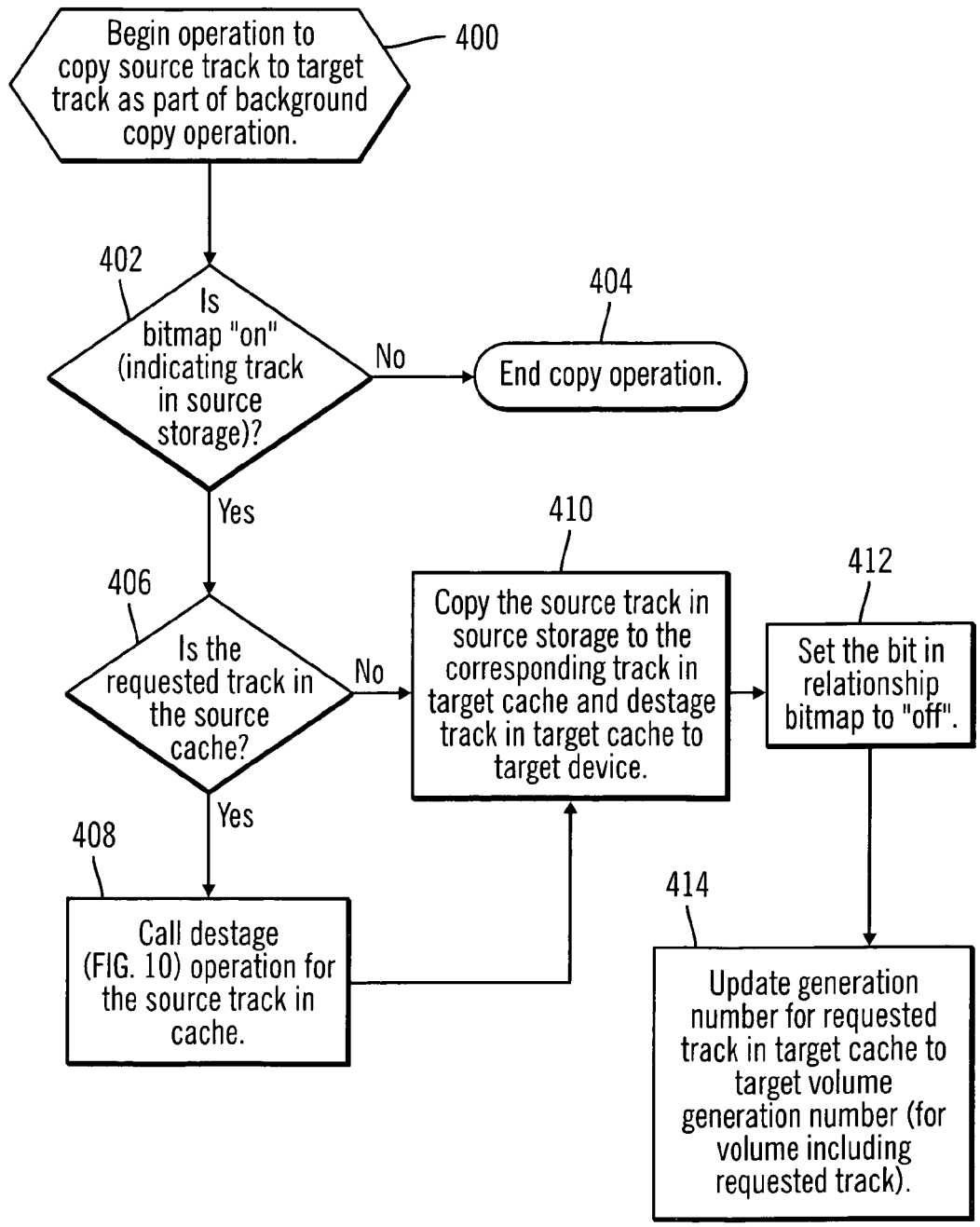

FIG. 11 illustrates logic implemented in the storage management software 18 to copy the data in the source storage 8a or cache 14a when the point-in-time copy relationship was established to the target storage 8b. This copy operation may be performed as part of a background operation, where host 4a, 4b . . . 4n I/O requests have priority over the copy operations. Control begins at block 400 when a copy operation is initiated to copy a source track indicated in the extent of source tracks 42 for a point-in-time copy relationship to the target. If (at block 402) the bit in the relationship bitmap 50 corresponding to the source track to copy is set to "off", then the copy operation ends (at block 404) because the track has already been copied over, which may occur when processing I/O or destage operations as discussed with respect to FIGS. 77–10. If (at block 402) the bit is set to "on" and if (at block 406) the track to copy is in the source cache 14a, then a destage operation is called (at block 408) to destage the track to copy using the logic described with respect to FIG. 10. If (at block 406) the track to copy is not in the source cache 14a or following block 408, then the storage management software 18 copies (at block 410) the source track in the source storage 14a the corresponding target track in the target cache 14b. The bit in the relationship table 40 corresponding to the copied track is then set (at block 412) to "off" and the track generation number 64a . . . 64n for the copied track 62a . . . 62n in the target 14b cache is set (at block 414) to the target volume generation number 82 (for the target volume 12a, 12b . . . 12m including the copied track) to indicate that the track was added to the target cache 14b after the point-in-time copy relationship was established.

The described logic of FIGS. 6–11 ensures that data consistency is maintained for a point-in-time copy relationship between source and target tracks without destaging source tracks from the source cache to source storage and without discarding target tracks in the target cache that are in cache at the point-in-time of the establishment.

Handling I/Os to Avoid Deadlocking

A relationship is established, as shown in FIG. 5 discussed above, without completing the destaging of source tracks in cache and discarding of target tracks in cache. As discussed with respect to FIG. 10, when destaging source tracks that were in cache when the relationship was established, the source tracks are staged into the corresponding track in the target cache and then destaged to the target device. In certain implementations, the destage and discard operations are scheduled as part of asynchronous scan operations that occur following the establishment of the relationship. Running the scans asynchronously following the establish allows the establishment of numerous relationships at a faster rate because the completion of the establishment is not delayed until the scan (i.e., removal from cache of source and target tracks) completes.

Figure 12:
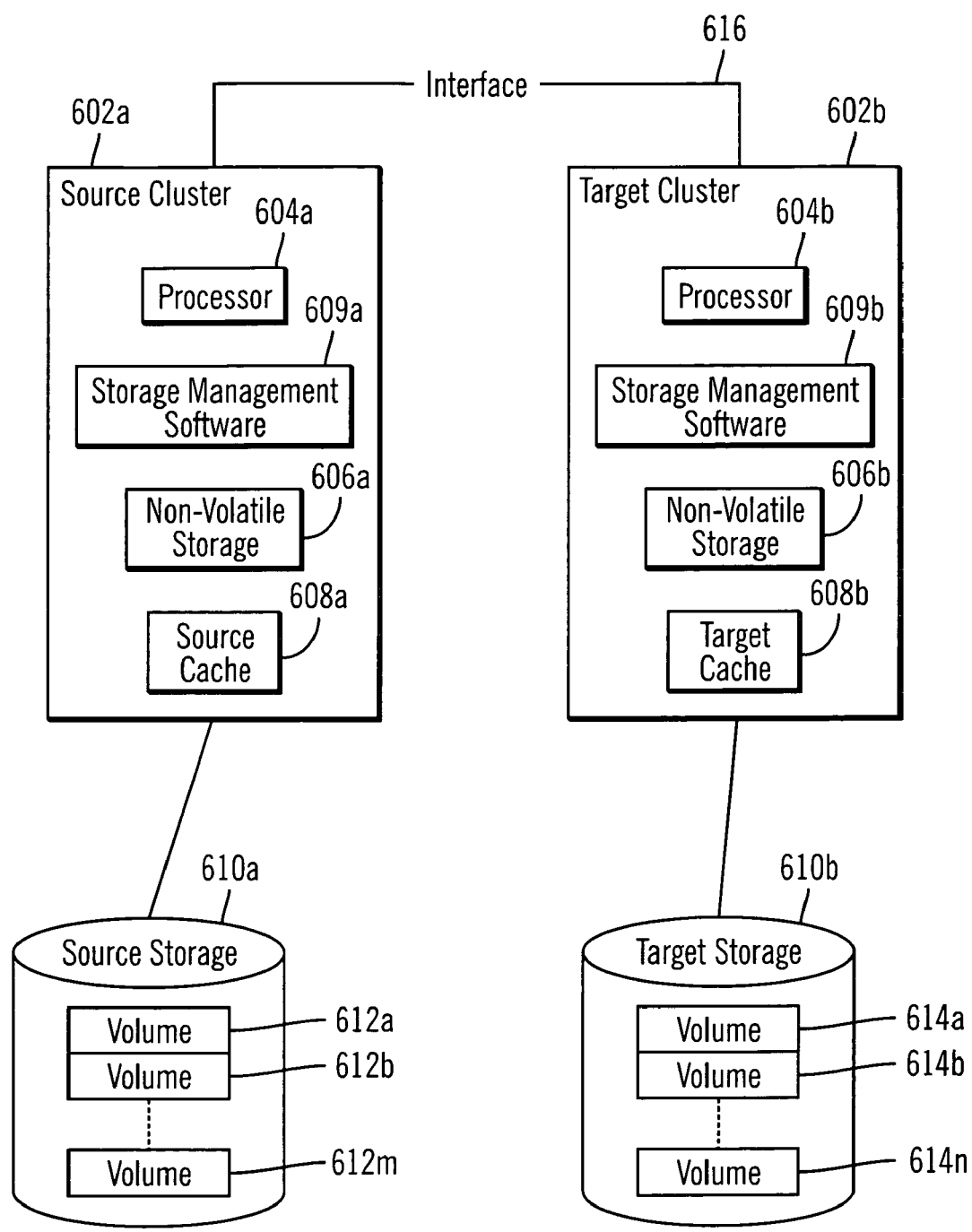
FIG. 12 illustrates an alternative computing environment in which aspects of the invention are implemented.

In certain implementations, the target and source tracks in a relationship may be included in different clusters, where each cluster includes a separate processor complex, cache, non-volatile storage, power boundary, etc. FIG. 12 illustrates two clusters, one referred to as source 602a and the other target 602b, where each cluster 602a, 602b includes a separate processor complex 604a, 604b, cache, referred to as—source cache 606a and target cache 606b, and non-volatile storage 608a, 608b to store updates. Each cluster 602a, 602b may be on separate power boundaries. The clusters 602a, 602b may be within a single storage controller or separate storage controllers that communicate over a network. Further, although the clusters 602a, 602b are designated as source and target for purposes of the below description, the cache 606a may include tracks that are target tracks in a point-in-time copy relationship and the cache 606b may include tracks that are source tracks in a point-in-time copy relationship.

Each cluster 602a, 602b includes storage management software 609a, 609b to perform storage management operations, including the operations described as performed by storage management software 18 discussed above and additional operations described below. Further, each cluster 602a, 602b accesses storage devices 610a, 610b, designated as source and target, that each include volumes 612a, 612b . . . 612m and 614a, 614b . . . 614n, respectively. Although storage devices 610a, 610b are designated as source and target for purposes of the below description, the storage 610a may include tracks that are target tracks in a point-in-time copy relationship and the storage 610b may include tracks that are source tracks in a point-in-time copy relationship. Still further, the storage management software 609a, 609b can perform all operations described with respect to the source and target clusters to operate in source or target mode. A point-in-time copy relationship may include source tracks managed by the source cluster 602a in the source cache 608a and target tracts managed by the target cluster 602b in the target cache 602b.

The processors 604a, 604b communicate through interface 616. If the clusters 602a, 602b are in different servers or storage controllers, then the interface 616 would comprise a network, such as a Storage Area Network (SAN), Local Area Network (LAN), Wide Area Network (WAN), etc. If the clusters 602a, 602b are in the same server or storage controller, then the interface 616 may comprise a bus enabling communication therebetween.

Figure 13:
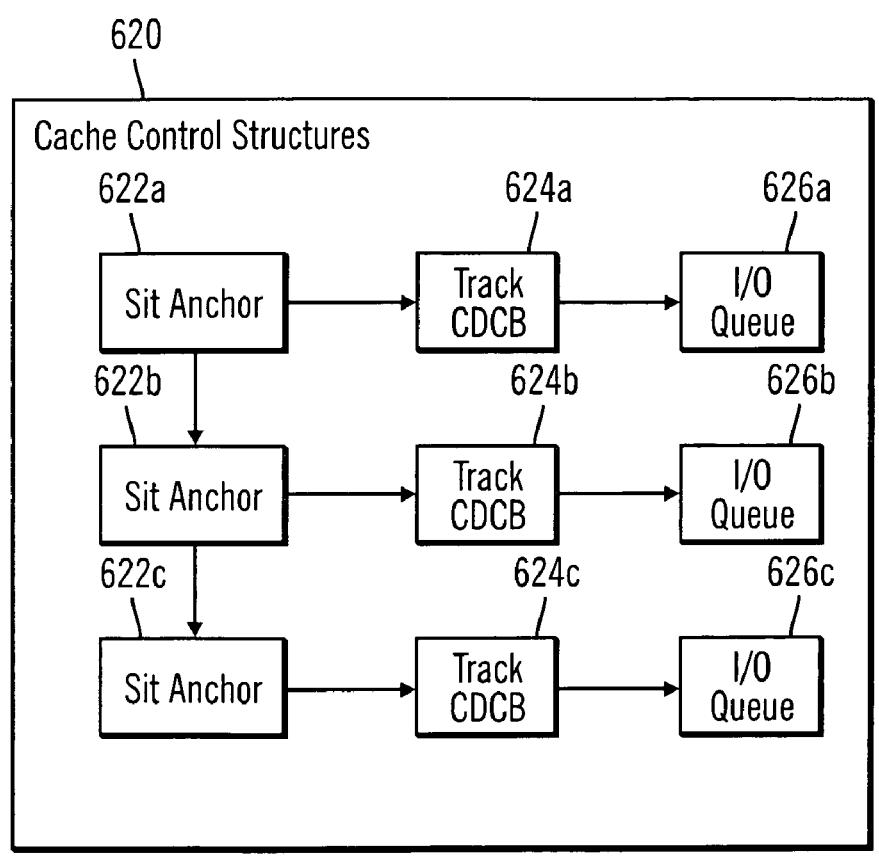
FIG. 13 illustrates an arrangement of information for tracks in cache used with implementations of the invention.

FIG. 13 illustrates cache control structures 620 providing information on each track in cache 608a, 608b, including for each track in cache 608a, 608b, one sit anchor 622a, 622b, 622c, one track CDCB 624a, 624, 624c and one I/O queue 626a, 626b, 626c for each track in which I/O requests for the track are queued. The cache control structures 620 may be implemented as a hash table, where a track number is hashed to one unique sit anchor 622a, 622b, and 622c, where each sit anchor is associated with a track CDCB 624a, 624b, and

624c providing information on the track and associated with an I/O queue 624a, 624b, 624c for the track in cache 608a, 608b. When the source and target tracks are in different clusters 602a, 602b, such as shown in FIG. 12, then separate cache control structures 620, including I/O queues, would be maintained for the source and target tracks. Thus, there would be source I/O queues for I/O requests directed to the source tracks in a relationship and separate target I/O queues for I/O requests directed to the target tracks. Further, the I/O requests in the source and target clusters 602a, 602b are processed by separate processors 604a, 604b.

A deadlock situation could arise if separate I/Os directed to a source and target track in a point-in-time copy relationship each require additional processing on the other track. For instance, I/Os on the source and target may request an additional operation on the other in order to proceed. However, that additional operation they each attempt is queued behind the current source and target I/O that issued the additional operations. A deadlock may occur when the current source and target I/Os are each waiting for an action to be performed by the other that cannot be performed because such additional requested operation is queued behind a current I/O operation that initiated the other additional request.

More specifically, a deadlock could occur if the source and target tracks are in different clusters and if a read request is directed to a target track where the asynchronous scan has not completed. In such situation, the storage management software 610a, 610b needs to ensure that any point-in-time data in the source storage 610a or source cache 608a is copied to the target cache 608b before the target read may proceed. This requirement is shown in FIG. 7, which ensures that for a target read to proceed, the source track must be copied to the target track in cache. In a situation where the source and target tracks are in different clusters 602a, 602b, the target processor 604b would issue a query and lock operation against the corresponding source track to ensure that a point-in-time copy of the source track in cache has been destaged before the read against the target track is allowed to proceed. The query and lock operation is effectively a destage request the target side initiates to cause any corresponding point-in-time copy of the source track in the source cache 608a to be destaged. This query and lock operation would be queued on the I/O queue in the source cluster 602a for the source track to which it is directed. The read request in the target I/O queue would have to wait until the query and lock destage operation on the source I/O queue completes. However, the query and lock in the source I/O queue may follow a write operation to the source track. If the point-in-time source data is in the source storage 610a, then the write in the source I/O queue would have to initiate an operation, such as a read request, in the corresponding track I/O queue to cause the source data in the source storage 610a to be staged to the target cache 608b. This read request to the target track would be queued in the I/O queue behind the pending read one the target queue. A deadlock could occur if the read to the target track is waiting for a query and lock request in the source I/O queue to complete to make sure the point-in-time source data is copied to the target while the query and lock request on the source side is waiting behind a write request to the source that requires a read/stage on the target to complete. This required read/stage on the target is in turn waiting behind the read to the target that initiated the query lock.

Figure 14:
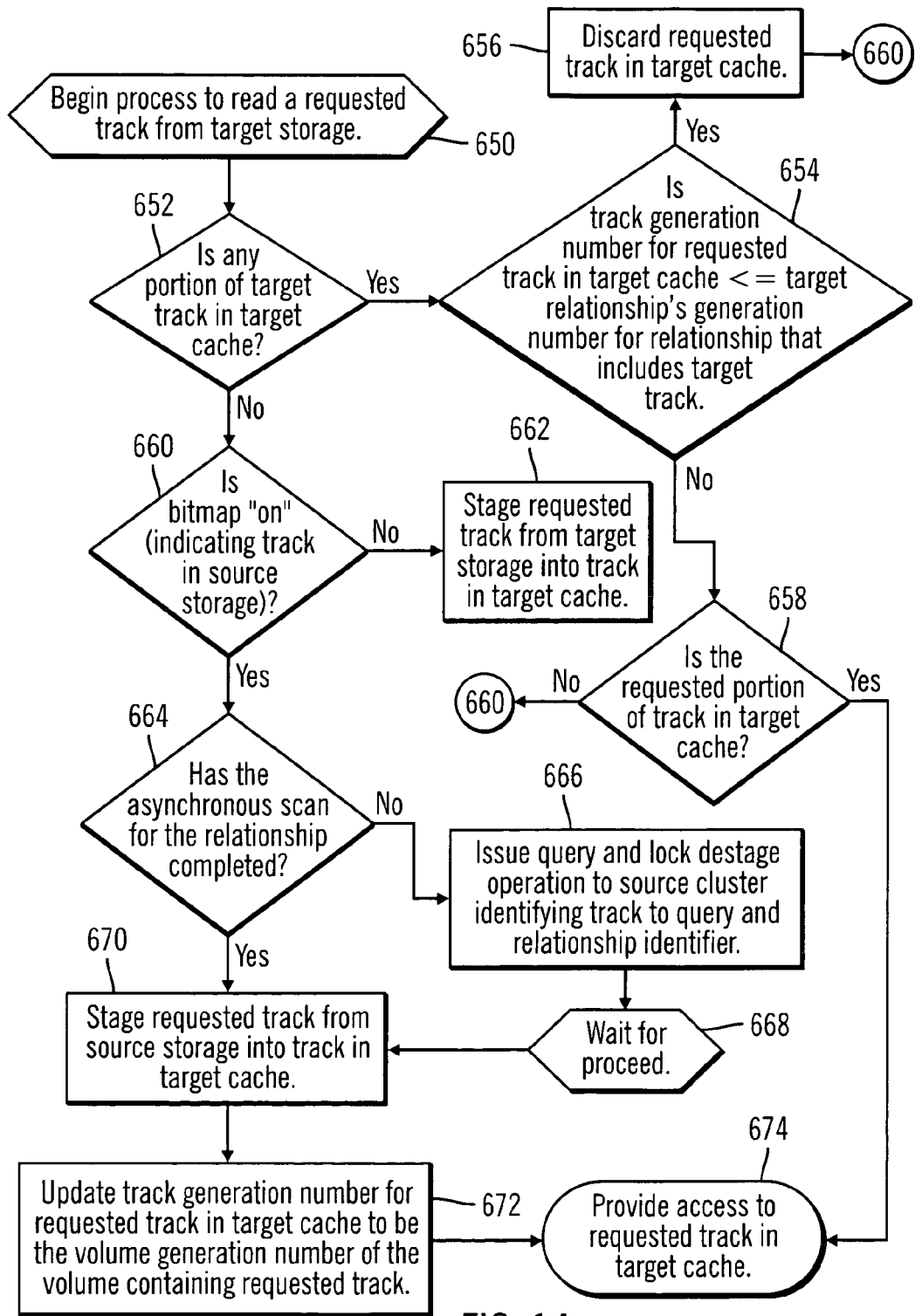
FIGS. 14, 15, and 16 illustrate operations performed to manage read requests to target tracks that are in a point-in-time copy relationship with source tracks.

Described implementations provide a technique for processing a query and lock destage request that a target cluster 602b would issue to a source cluster 602a in a manner that avoids a deadlock. FIG. 14 illustrates operations performed in the storage management software 610b to handle a read request to a target track in a point-in-time copy relationship. The logic of FIG. 14 would comprise a modification to the logic of FIG. 7 to handle target reads when the target and source tracks are in different clusters 602a, 602b. In response to receiving a read to a target track (at block 650), if (at block 652) any portion of the target track is in the target cache 14b, then the storage management software 610b determines (at block 654) whether the track generation number 64a . . . 64n for the requested track in the target cache, which would be included in the track metadata 60a . . . 60n (FIG. 3) for the requested target track, is less than or equal to the target relationship generation number 48 for the relationship table entry 40 that includes the target track, i.e., was the target track in the target cache before the point-in-time copy relationship was created. If so, then the requested target track in the target cache 14b (FIG. 1) is discarded (at block 656) and control proceeds to block 660 to provide access to the target track.

If (from the no branch of block 654) the requested target track in the target cache was added to cache after the point-in-time relationship was established, then a determination is made (at block 658) as to whether the requested portion is in the target cache 608b. If the requested portion of the target track is not in the target cache 608b (from the no branch of block 658, the no branch of block 652 or block 656), then a determination is made (at block 660) as to whether the bit in the relationship bitmap 50 for the requested target track is "on", indicating that the track in the source storage has not been copied over. If the bit is not "on", then the storage management software 18 stages (at block 662) the requested track from the target storage 610b into the target cache 608b. If the bitmap is "on" and if (at block 664) the asynchronous scan of the relationship has not completed, then a query and lock destage operation is issued (at block 666) to the source cluster 602a identifying the track to query and the relationship identifier. This unique identifier would allow the storage management software 610a to access the relationship information for the relationship in which the target track is included. The source cluster 602a will only return proceed to the query and lock destage request from the target cluster 602b when the point-in-time copy of the source track in the source cache 608a has been destaged to the source storage 610a.

In response to receiving (at block 668) the proceed from the source cluster 602a to the query and lock request, the storage management software 610b handling the read request to the target track would then stage the requested track (at block 670) from the target storage 610b into the target cache 608b and update the track generation number for the requested track to the volume generation number of the volume containing the requested track. From blocks 658 (yes branch) or 672, once the requested track is in the target cache 14b, then access is provided (at block 674) to the requested track in the target cache 14b.

Figure 15:
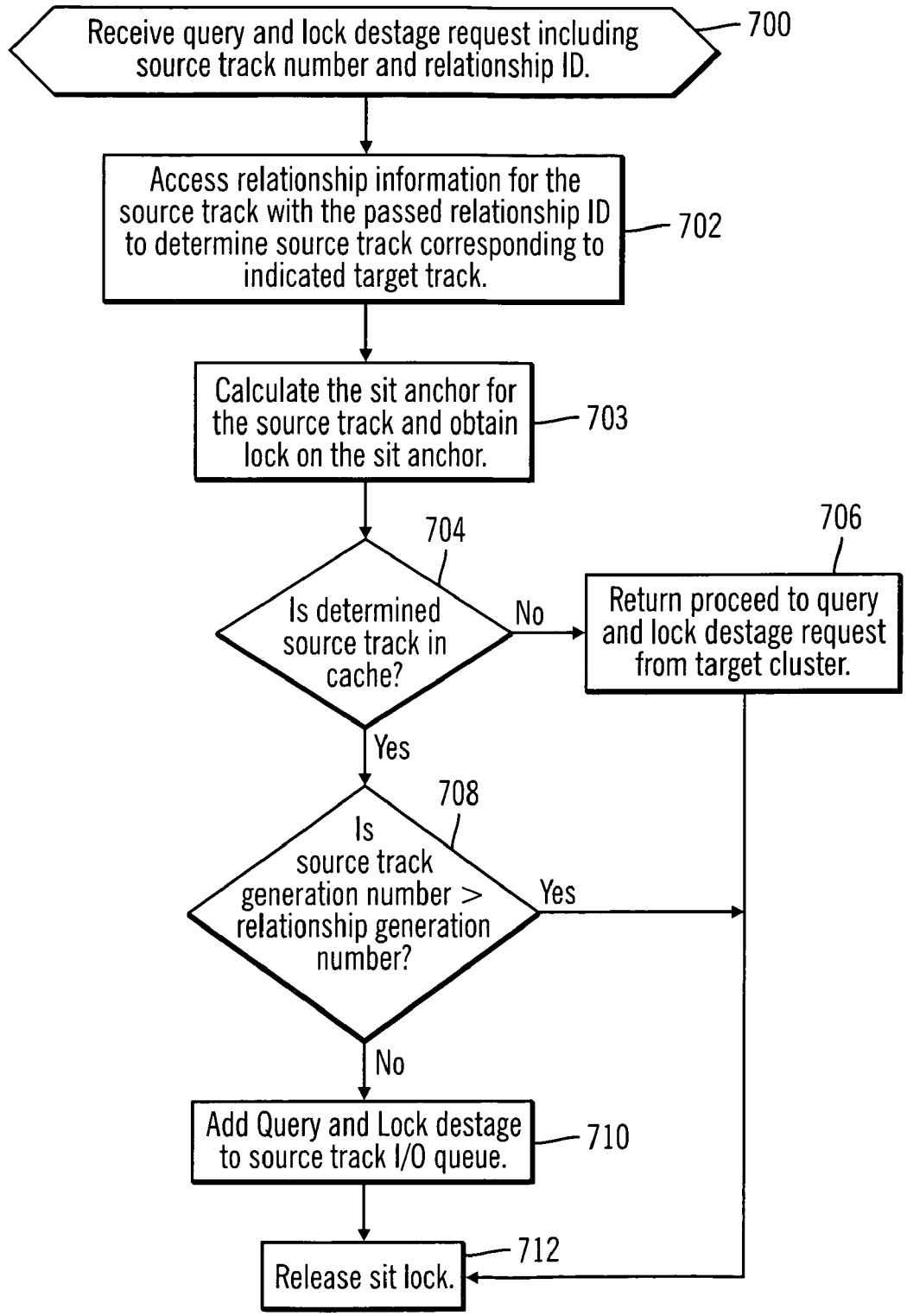

FIG. 15 illustrates operations performed by the source storage management software 610a to process a query and lock destage request from a target cluster 602b. In response to the request (at block 700) including the source track number and relationship ID, the storage management software 610a accesses (at block 702) the relationship information for the relationship identified in the query and lock request to determine the source track corresponding to the target track indicated in the request. Both the source and target clusters 610a, 610b would maintain relationship information, such as shown in FIG. 2, including information on relationships in which their tracks are included, such as whether the data has been copied from source to target, the relationship generation relationship ID, and a correspondence of source and target tracks. Such relationship information would allow the storage management software 610a, 610b to determine active point-in-time copy relationships including their tracks, and the relationship of their tracks as source and target tracks and the corresponding tracks in the relationship. The copending and commonly assigned patent application entitled "Method, System, and Program for Managing a Relationship Between One Target Volume and One Source Volume", having attorney docket no. TUC920030023US1, filed on the same date hereof, which patent application is incorporated herein by reference in its entirety, provides further details on how relationship information may be maintained with source and target volumes. The storage management software 18 further acquires (at block 703) the sit anchor 622a, 622b, 622c for the source track and obtains a lock on the sit anchor. This prevents any further I/O from getting queued and processed before the query and lock destage is completed. However, there may be pending I/O requests on the I/O queue that are processed before the query and lock destage is completed.

If (at block 704) the determined source track is not in the source cache 608a, then the source cluster 602a returns proceed (at block 706) to the query and lock request from the target cluster 602b. Otherwise, if the determined source track is in the source cache 608a, but has been modified (at block 708) after the relationship (identified in the query and lock request) was established, then the source cluster 602a returns proceed (at block 706) to the query and lock request from the target cluster 602b because the source track would have already been destaged to the source storage 610a per the logic of FIG. 9. A source track in source cache 608a is determined to be modified after the relationship was established if the source track generation number is greater than the relationship generation number. If the source track was in the source cache 608a at the time when the relationship was established (i.e., the source track generation number is less than or equal to the relationship generation number), then the storage management software 610a adds (at block 710) a query and lock destage operation to the I/O queue 626a, 626b, 626c (FIG. 12) for the determined source track. The sit lock for the I/O queue is then released (at block 712) after block 706 or 710.

Figure 16:
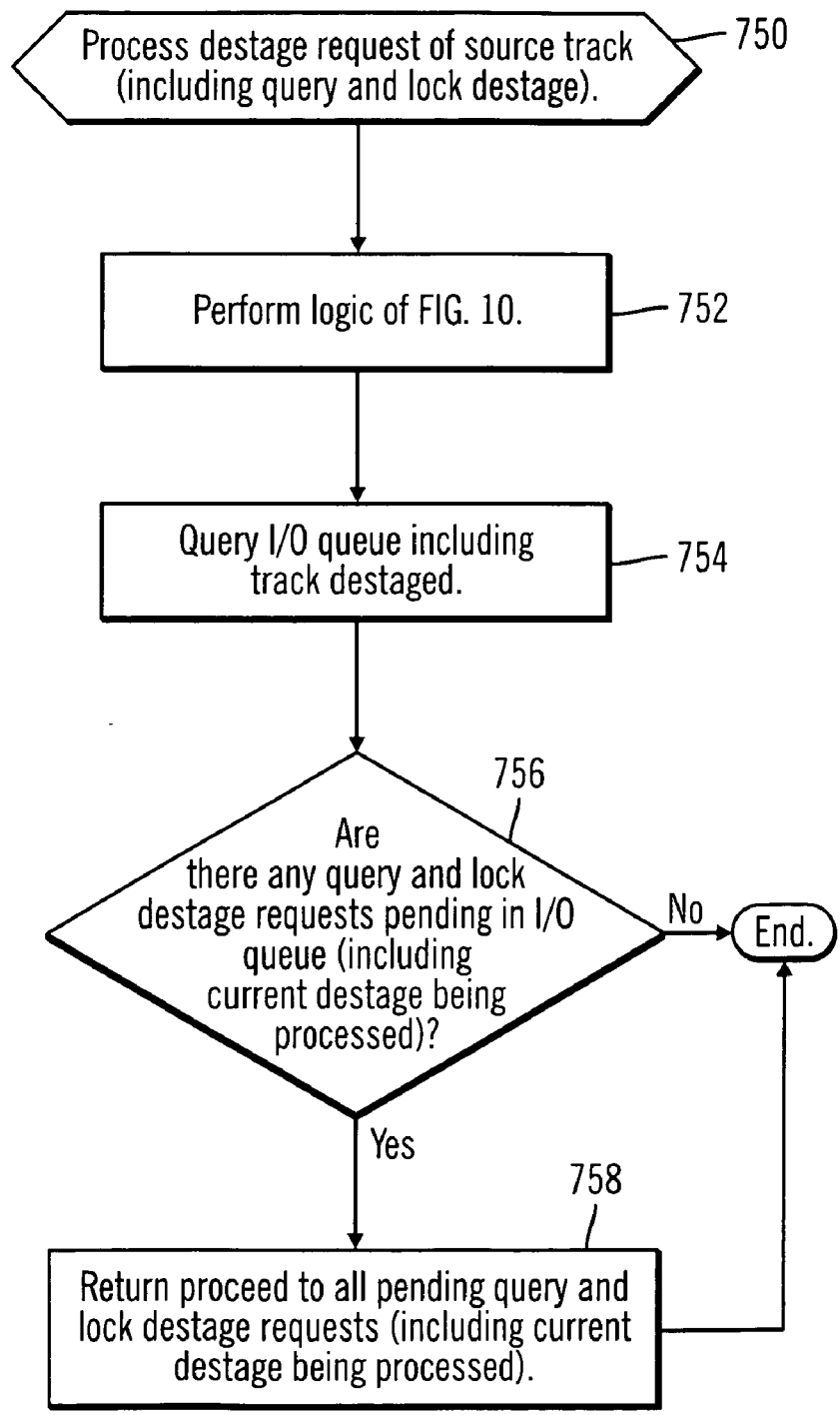

FIG. 16 illustrates operations performed by the source storage management software 610a to process a destage request, which would be a modification to the logic of FIG. 10 for a situation where the source and target tracks are in different clusters 602a, 602b. Upon processing (at block 750) a destage request, including a query and lock destage request, the source storage management software 610a would perform (at block 752) the logic of FIG. 10 to destage the source track from the source cache 608a. The I/O queue 626a, 626b, 626c for the source track just destaged would then be queried (at block 754) to determine whether there are any query and lock destage requests pending in the I/O queue 626a, 626b, 626c, including the current destage request being processed. If (at block 756) there are query and lock destage requests pending and/or being processed in the I/O queue, then proceed is returned (at block 758) to the one or more target clusters 602b that initiated the located query and lock destage requests. If a source track is a source for target tracks in different relationships, then different target clusters may have initiated different query and lock destage requests in the source track I/O queue, and the source cluster would return complete to all the clusters that initiated the query and lock destage request. If there are no query and lock destages pending in the queue, then control ends.

The above described logic of FIGS. 14–16 describes operations performed by clusters managing requests to source and target tracks in a relationship in a manner that avoids a deadlock occurring between source and target clusters 602a, 602b when a target read occurs. The above described deadlock is avoided because a write to the source does not have to wait for the target side to complete staging the source data from the source storage 610a to the target cache 608b. Instead, a target read will add a query and lock destage request to the source I/O queue so that when a destage to the source track completes, proceed is returned to the source cluster indicating that the source track was destaged. In this way, a write to a source track in source cache 608a does not have to wait for the target side to stage the source data to the target cache 608b. Instead, when the write to the source occurs, the logic of FIG. 10 would destage the source track from source cache 608a before performing the write to ensure that a point-in-time copy of the source track in source storage 610 is copied to the target cache 608b and not overwritten with data modified after the point-in-time relationship is established. At this time, any pending target reads may continue, as proceed would be returned to query and lock requests in the source I/O queue.

Additional Implementation Details

The described techniques for managing requests to a target track in a relationship may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In certain implementations, at initialization, each volume would be assigned an initial volume generation number 82. This allows tracks to function as source tracks to different target tracks in different point-in-time copy relationships. In certain implementations, whenever performing the I/O and cache management operations described with respect to FIGS. 6–11 and 14–16, against a track that is a source track, i.e., listed in an extent of source tracks, in multiple point-in-time copy relationships, such operations are performed with respect to the subject track for each relationship in which the track is defined as a source track subject. Thus, the described logic would be separately performed for each point-in-time copy relationship.

The described implementations for establishing a logical point-in-time copy relationship were described for use with systems deployed in a critical data environment where high availability is paramount. However, those skilled in the art will appreciate that the point-in-time copy operations described herein may apply to storage systems used for non-critical data where high availability is not absolutely necessary.

In the described implementations, track and volume generation numbers were used to determine whether a track that is a source or target track in a point-in-time copy relationship was present in cache when the relationship was established. Those skilled in the art will appreciate that alternative variables and checking techniques may be used to determine whether a track in cache was added to cache before or after a point-in-time copy relationship was established.

In described implementations, the track and volume generation numbers are incremented and involved in specific compare operations. In alternative implementation, the track and volume generation numbers may be incremented and compared in a manner different than described to determine whether a track was in cache when the point-in-time copy relationship was established. For instance, the determination of whether a track was in cache may comprise determining whether the track generation number is less than the volume generation number, which is incremented before the point-in-time relationship is established, and which is incremented before the volume generation number is copied into the relationship table entry. Thereafter, any track added to cache is assigned the volume generation number, so that it be deemed to have been added to cache after the point-in-time relationship is established.

The source and target cache may be implemented in a same memory device or separate memory devices.

In certain implementations, the query and lock destage request is used in an environment where the source and target tracks were managed by different clusters 602a, 602b, such that I/O requests directed to the source and target tracks would be handled by different processors in the different clusters. In alternative implementations, the query and lock destage logic described above may be implemented when a single cluster/processor manages I/O requests to both the source and target tracks in the relationship.

In the described implementations, determinations are made as to whether certain time periods fall within a threshold. In alternative implementations, different time conditions may be checked with respect to pending scan requests than those described herein to determine whether to initiate a scan.

The illustrated logic of FIGS. 6–11 and 14–16 show certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

The variables n and m are used to denote any integer variable for certain of the described elements and may indicate a same or different integer value when used in different instances.

Figure 17:
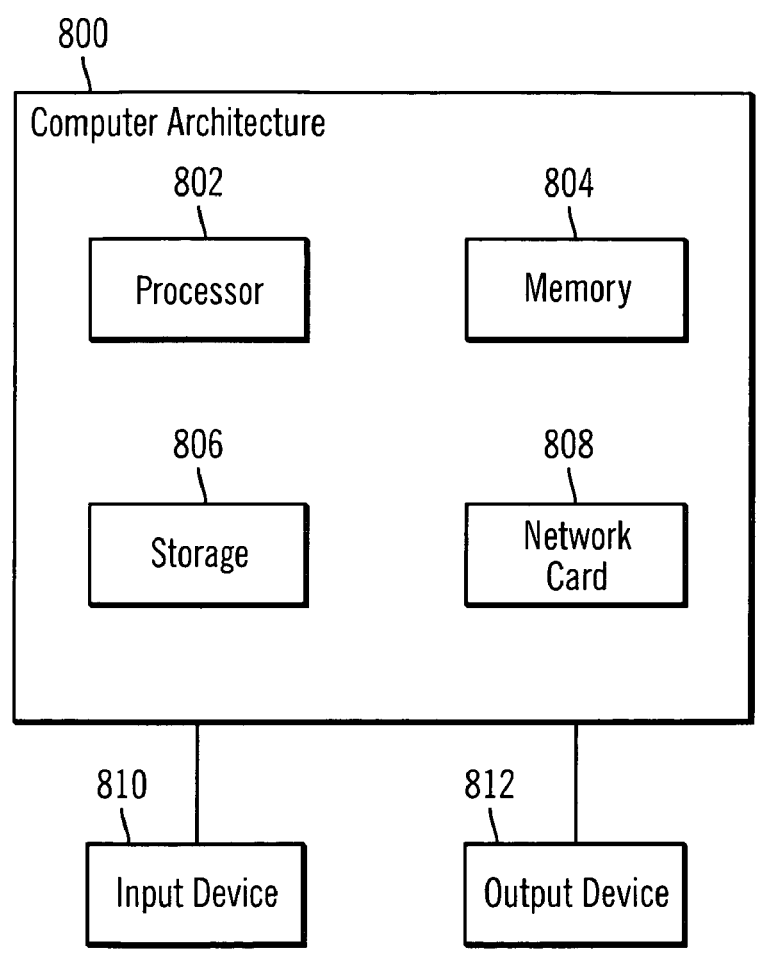
FIG. 17 illustrates an architecture of computing components in the network environment, such as the hosts and storage controller, and any other computing devices.

FIG. 17 illustrates one implementation of a computer architecture 800 of the network components, such as the hosts and storage controller shown in FIG. 1. The architecture 800 may include a processor 802 (e.g., a microprocessor), a memory 804 (e.g., a volatile memory device), and storage 806 (e.g., a non-volatile storage, such as magnetic disk drives, optical disk drives, a tape drive, etc.). The storage 806 may comprise an internal storage device or an attached or network accessible storage. Programs in the storage 806 are loaded into the memory 804 and executed by the processor 802 in a manner known in the art. The architecture further includes a network card 808 to enable communication with a network. An input device 810 is used to provide user input to the processor 802, and may include a keyboard, mouse, pen-stylus, microphone, touch sensitive display screen, or any other activation or input mechanism known in the art. An output device 812 is capable of rendering information transmitted from the processor 802, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for managing data, comprising:

receiving a data request to a target track in a copy relationship, wherein the copy relationship associates a source track with the target track, wherein the source and target tracks are maintained in at least one storage medium;

submitting a destage request to destage the source track in response to the data request to the target track, wherein executing the data request to the target track is conditioned on receiving a complete response to the destage request;

if the source track is not in a cache, returning the complete response to the destage request, wherein the cache is implemented in at least one computer readable medium;

if the source track was in the cache when the copy relationship was established, adding the destage request to an Input/Output (I/O) queue for the source track; and after the source track is destaged in response to processing the destage request in the I/O queue, returning the complete response to the destage request.

2. The method of claim 1, further comprising:

staging the destaged source track to the target track in the cache after receiving the complete response to the destage request; and performing the data request to the target track after staging the destaged source track.

3. The method of claim 1, wherein the destage request indicates the target track and the copy relationship, further comprising:
processing copy relationship information for the copy relationship indicated in the destage request to determine the source track corresponding to the target track.

4. The method of claim 3, wherein I/O requests to the source track are handled by a first processor and I/O requests to the target track are handled by a second processor, wherein the first and second processors maintain the copy relationship information on the copy relationships including tracks they manage.

5. The method of claim 1, further comprising:
determining whether any source and target tracks in the cache when the copy relationship was established have been removed from the cache, wherein the request to destage the source track is submitted if the source and target tracks in the cache when the copy relationship was established are determined to have not been removed from the cache.

6. The method of claim 5, wherein the source tracks are made unmodified in the cache by destaging the source tracks from the cache and wherein the target tacks are removed from the cache by discarding the target tracks in the cache.

7. The method of claim 1, further comprising:
if the source track is in the cache but was added to the cache after the copy relationship was established, then returning the complete response to the destage request.

8. The method of claim 1, further comprising:
acquiring a lock on the source I/O queue for the source track when receiving the destage request to the source I/O queue; and
releasing the lock on the source I/O queue after returning the complete response or after adding the destage request to the source I/O queue.

9. The method of claim 1, further comprising:
completing a request to destage the source track from the cache;
determining whether there is at least one destage request in the I/O queue for the source track submitted in response to the data request to the target track; and
returning the complete response to the destage request submitted in response to the data request to the target track.

10. The method of claim 9, wherein the processed request to destage the source track is not submitted in response to one data request to one target track.

11. The method of claim 9, wherein there are multiple requests to destage the source track in the I/O queue submitted in response to data requests to at least one target track corresponding to the source track in at least one copy relationship, and wherein the complete response is returned to each determined destage request in the I/O queue submitted in response to one data request to one target track.

12. The method of claim 9, wherein the processed request to destage the source track was submitted in response to one data request to one target track corresponding to the source track, and wherein the complete response is returned to the destage request after processing the request to destage the source track that was submitted in response to one data request to one target track.

13. The method of claim 1, wherein the copy relationship comprises a point-in-time copy relationship between source and target tracks.

14. A system for managing data, comprising:
a source storage including source tracks;
a target storage including target tracks, wherein the source and target tracks are implemented in at least one storage medium;
a cache implemented in at least one computer readable medium;
means for receiving a data request to one target track in a copy relationship, wherein the copy relationship associates one source track with the target track;
means for submitting a destage request to destage the source track in response to the data request to the target track, wherein executing the data request to the target track is conditioned on receiving a complete response to the destage request;
means for returning the complete response to the destage request if the source track is not in the cache;
means for adding the destage request to an Input/Output (I/O) queue for the source track if the source track was in the cache when the copy relationship was established; and
means for returning the complete response to the destage request after the source track is destaged in response to processing the destage request in the I/O queue.

15. The system of claim 14, further comprising:
means for staging the destaged source track to the target track in the cache after receiving the complete response to the destage request; and
means for performing the data request to the target track after staging the destaged source track.

16. The system of claim 14, further comprising:
a first processor, wherein I/O requests to the source track are handled by the first processor; and
a second processor, wherein I/O requests to the target track are handled by a second processor, wherein the first and second processors maintain copy relationship information on copy relationships including tracks they manage.

17. The system of claim 14, further comprising:
means for determining whether any source and target tracks in the cache when the copy relationship was established have been removed from the cache, wherein the request to destage the source track is submitted if the source and target tracks in the cache when the copy relationship was established are determined to have not been removed from the cache.

18. The system of claim 14, further comprising:
means for completing a request to destage the source track from the cache;
means for determining whether there is at least one destage request in the I/O queue for the source track submitted in response to the data request to the target track; and
means for returning the complete response to the destage request submitted in response to the data request to the target track.

19. The system of claim 18, wherein there are multiple requests to destage the source track in the I/O queue submitted in response to data requests to at least one target track corresponding to the source track in at least one copy relationship, and wherein the complete response is returned to each determined destage request in the I/O queue submitted in response to one data request to one target track.

20. A device implementing code for managing data in source and target tracks and in a cache implemented in at least one computer readable medium, wherein the source and target tracks are implemented in at least one storage medium, and wherein the code causes computer implemented operations to be performed, the operations comprising:

receiving a data request to one target track in a copy relationship, wherein the copy relationship associates one source track with the target track;

submitting a destage request to destage the source track in response to the data request to the target track, wherein executing the data request to the target track is conditioned on receiving a complete response to the destage request;

if the source track is not in the cache, returning the complete response to the destage request;

if the source track was in the cache when the copy relationship was established, adding the destage request to an Input/Output (I/O) queue for the source track; and after the source track is destaged in response to processing the destage request in the I/O queue, returning the complete response to the destage request.

21. The device of claim 20, wherein the operations further comprise:

staging the destaged source track to the target track in the cache after receiving the complete response to the destage request; and performing the data request to the target track after staging the destaged source track.

22. The device of claim 20, wherein the destage request indicates the target track and the copy relationship, wherein the operations further comprise:

processing copy relationship information for the copy relationship indicated in the destage request to determine the source track corresponding to the target track.

23. The device of claim 22, wherein I/O requests to the source track are handled by a first processor and I/O requests to the target track are handled by a second processor, wherein the first and second processors maintain copy relationship information on copy relationships including tracks they manage.

24. The device of claim 20, wherein the operations further comprise:

determining whether any source and target tracks in the cache when the copy relationship was established have been removed from the cache, wherein the request to destage the source track is submitted if the source and target tracks in the cache when the copy relationship was established are determined to have not been removed from the cache.

25. The device of claim 24, wherein the source tracks are made unmodified in the cache by destaging the source tracks from the cache and wherein the target tracks are removed from the cache by discarding the target tracks in the cache.

26. The device of claim 20, wherein the operations further comprise:

if the source track is in the cache but was added to the cache after the copy relationship was established, then returning the complete response to the destage request.

27. The device of claim 20, wherein the operations further comprise:

acquiring a lock on the source I/O queue for the source track when receiving the destage request to the source I/O queue; and releasing the lock on the source I/O queue after returning the complete response or after adding the destage request to the source I/O queue.

28. The device of claim 20, wherein the operations further comprise:

completing a request to destage the source track from the cache;

determining whether there is at least one destage request in the I/O queue for the source track submitted in response to the data request to the target track; and returning the complete response to the destage request submitted in response to the data request to the target track.

29. The device of claim 28, wherein the processed request to destage the source track is not submitted in response to one data request to one target track.

30. The device of claim 28, wherein there are multiple requests to destage the source track in the I/O queue submitted in response to data requests to at least one target track corresponding to the source track in at least one copy relationship, and wherein the complete response is returned to each determined destage request in the I/O queue submitted in response to one data request to one target track.

31. The device of claim 28, wherein the processed request to destage the source track was submitted in response to one data request to one target track corresponding to the source track, and wherein the complete response is returned to the destage request after processing the request to destage the source track that was submitted in response to one data request to one target track.

32. The device of claim 20, wherein the copy relationship comprises a point-in-time copy relationship between source and target tracks.

33. The device of claim 20, wherein the device comprises at least one of a computer readable storage medium implementing the code that is executed to perform the operations and a hardware device implementing the code as hardware logic.

* * * * *